(12) United States Patent
Zhang et al.

(10) Patent No.: US 8,536,249 B2
(45) Date of Patent: Sep. 17, 2013

(54) ELASTOMER COMPOSITE AND METHOD FOR PRODUCING IT

(75) Inventors: Xuan Zhang, Woburn, MA (US);
Michael D. Morris, Nashua, NH (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 12/231,005

(22) Filed: Aug. 28, 2008

(65) Prior Publication Data

US 2009/0062428 A1    Mar. 5, 2009

Related U.S. Application Data

(60) Provisional application No. 60/966,853, filed on Aug. 30, 2007.

(51) Int. Cl.
*C08J 3/215* (2006.01)

(52) U.S. Cl.
USPC .......................................... 523/334

(58) Field of Classification Search
USPC ................... 523/212, 213; 524/492, 493
See application file for complete search history.

(56) References Cited

U.S. PATENT DOCUMENTS

| | | | |
|---|---|---|---|
| 1,980,774 A | 11/1934 | Twiss et al. | |
| 4,020,026 A * | 4/1977 | Janssen et al. | 524/252 |
| 5,763,388 A | 6/1998 | Lightsey et al. | |
| 6,040,364 A | 3/2000 | Mabry et al. | |
| 6,048,923 A | 4/2000 | Mabry et al. | |
| 6,075,084 A | 6/2000 | Mabry et al. | |
| 6,365,663 B2 | 4/2002 | Mabry et al. | |
| 6,413,478 B1 | 7/2002 | Mabry et al. | |
| 6,646,028 B2 | 11/2003 | Ramos et al. | |
| 6,841,606 B2 | 1/2005 | Yanagisawa et al. | |
| 6,929,783 B2 | 8/2005 | Chung et al. | |
| 7,101,922 B2 | 9/2006 | Chen et al. | |
| 7,105,595 B2 | 9/2006 | Mabry et al. | |
| 2003/0060557 A1 * | 3/2003 | Tasaka et al. | 524/484 |
| 2006/0205867 A1 * | 9/2006 | Yanagisawa et al. | 524/575.5 |

FOREIGN PATENT DOCUMENTS

| | | |
|---|---|---|
| GB | 1192407 A | 5/1970 |
| GB | 1421012 A | 3/1973 |
| GB | 1421011 A | 1/1976 |
| JP | 63-161002 | 7/1988 |
| JP | 2005220187 A | 8/2005 |
| JP | 2006152117 A | 6/2006 |
| JP | 2006169483 A | 6/2006 |
| JP | 2006193620 A | 7/2006 |
| JP | 2006-219618 | 8/2006 |
| JP | 2006225598 A | 8/2006 |
| JP | 2006225599 A | 8/2006 |
| JP | 2006225600 A | 8/2006 |
| JP | 2006225606 A | 8/2006 |
| JP | 2006265311 A | 10/2006 |
| JP | 2006347203 A | 12/2006 |
| JP | 2007224067 A | 9/2007 |
| JP | 2007231153 A | 9/2007 |
| WO | WO 96/18688 | 6/1996 |
| WO | WO 2005/113651 | 12/2005 |

OTHER PUBLICATIONS

"Laboratory Report: Recent Studies at the Malaysian Rubber Producers' Research Association Winter and All-season Tyres", *Tribology International*, 26(4): 285, 1993.
Partial manual translation of JP 63-161002.
Partial manual translation of JP 2006-219618.

* cited by examiner

*Primary Examiner* — Doris Lee

(57) ABSTRACT

An elastomer composite includes the coagulated product of a mixture of a particulate slurry and a latex blend comprising skim latex and at least one of field latex and latex concentrate.

11 Claims, 1 Drawing Sheet

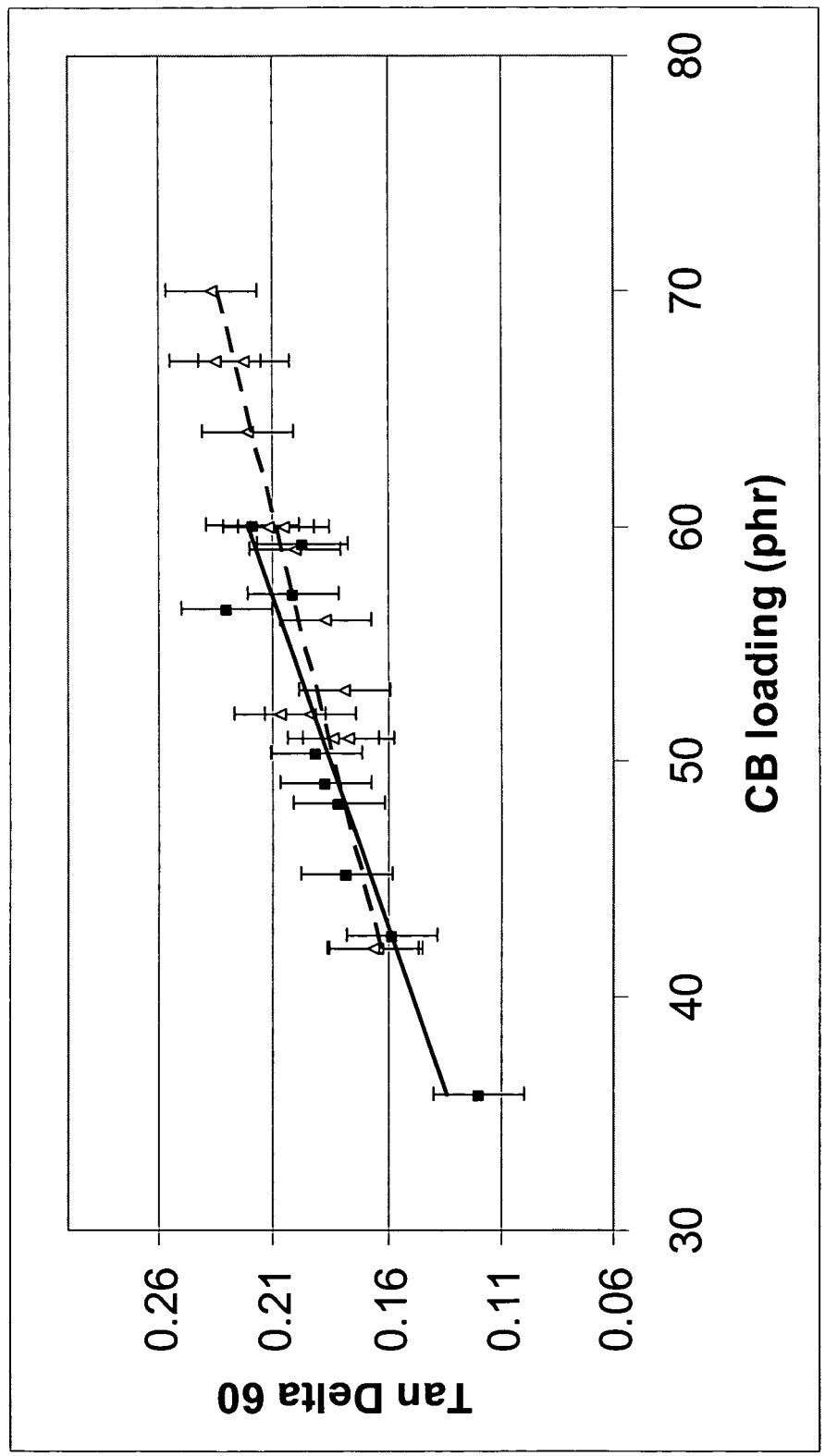

ELASTOMER COMPOSITE AND METHOD FOR PRODUCING IT

RELATED APPLICATIONS

This application claims priority to U.S. Provisional Application No. 60/966,853, filed Aug. 30, 2007, the entire contents of which are incorporated herein by reference.

BACKGROUND OF THE INVENTION

1. Field of the Invention

The present invention relates to methods for producing elastomer composites.

2. Description of the Related Art

Numerous products of commercial significance are formed of elastomeric compositions wherein particulate filler is dispersed in any of various synthetic elastomers, natural rubber or elastomer blends. Carbon black, for example, is widely used as a reinforcing agent in natural rubber and other elastomers. It is common to produce a masterbatch, that is, a premixture of filler, elastomer and various optional additives, such as extender oil. Carbon black masterbatch is prepared with different grades of commercially available carbon black which vary both in surface area per unit weight and in structure, a description of the size and complexity of aggregates of carbon black formed by the fusion of primary carbon black particles to one another. Numerous products of commercial significance are formed of such elastomeric compositions of carbon black particulate filler dispersed in natural rubber and other elastomers. Such products include, for example, vehicle tires wherein different elastomeric compositions may be used for the tread portion, sidewalls, wire skim and carcass. Other products include, for example, engine mount bushings, conveyor belts, windshield wipers and the like.

There are a variety of methods for producing carbon black masterbatch. In one method, disclosed in U.S. Pat. No. 6,841,606 ("the '606 patent"), a carbon black slurry and an elastomer latex are combined in a vat and then coagulated by the addition of a coagulant, such as an acid. In a variation of this process, disclosed in Japanese Patent Publication No. 2005220187, natural rubber latex is diluted to 20% rubber content (from about 24% rubber) and combined with a protease to cleave amide bonds the non-rubber components of the latex. The cleavage is believed to improve the performance of the final rubber product. In another variation, disclosed in Japanese Patent Publication No. 2006152117, a masterbatch prepared with diluted latex and carbon black slurry is dry mixed with transformer polybutadiene and N,N'-diphenylmethane bismaleimide to improve the balance between improved elasticity and increased heat buildup in tires produced from the rubber.

In another method, disclosed in U.S. Pat. No. 6,048,923, the contents of which are incorporated by reference herein, a continuous flow of a first fluid including an elastomer latex is fed to the mixing zone of a coagulum reactor. A continuous flow of a second fluid including a carbon black slurry is fed under pressure to the mixing zone to form a mixture with the elastomer latex. The mixing of the two fluids is sufficiently energetic to substantially completely coagulate the elastomer latex with the carbon black prior to a discharge end of the coagulum reactor. As disclosed in U.S. Pat. No. 6,929,783, the coagulum may then be fed to a dewatering extruder.

At high loadings of carbon black, the coagulum emerges from the coagulum reactor not as a continuous flow of carbon black-elastomer composite but as a plurality of discrete carbon black-elastomer composite regions carried by a substantially coagulum-free aqueous phase. The latter material does not pass as easily through the dewatering extruder and can clog the apparatus because it flows under shear (and can therefore backflow within the dewatering extruder). It is desirable to prepare a continuous flow of coagulum containing a high volume fraction of carbon black that is more easily accommodated by apparatus such as a dewatering extruder.

SUMMARY OF THE INVENTION

In one aspect, the invention is a method of producing an elastomer composite, e.g., a composite including a particulate dispersed in an elastomer matrix. The method includes providing a particulate slurry, providing a latex blend comprising, consisting essentially of, or consisting of skim latex and at least one of field latex and latex concentrate, and combining the particulate slurry and the latex blend to form a mixture under conditions in which the mixture coagulates.

The latex blend may include field latex at a ratio from about 20:1 to about 1:1 by volume with respect to skim latex. The latex blend may include latex concentrate at a ratio from about 20:1 to about 1:2 by volume with respect to skim latex. The latex blend may include both field latex and latex concentrate in combination with skim latex. The latex blend may further include water. The dry rubber content of the latex blend may be at least 15% by weight. Combining may include feeding a continuous flow of carbon black slurry under pressure to a mixing zone of a coagulum reactor to form a mixture with the latex blend, the carbon black being effective to coagulate the latex within the latex blend, and the feeding of the latex blend and the carbon black slurry within the mixing zone being sufficiently energetic to substantially completely coagulate the latex with the carbon black in the coagulum reactor.

In another aspect, the invention is an elastomer composite including the coagulated product of a mixture of a particulate slurry and a latex blend comprising, consisting essentially of, or consisting of skim latex and at least one of field latex and latex concentrate. The latex blend may further include water. The dry rubber content of the latex blend may be at least 15% by weight. The latex blend may include field latex at a ratio from about 20:1 to about 1:1 by volume with respect to skim latex. The latex blend may include latex concentrate at a ratio from about 20:1 to about 1:2 by volume with respect to skim latex. The latex blend may include both field latex and latex concentrate in combination with skim latex. Combining may include feeding a continuous flow of carbon black slurry under pressure to a mixing zone of a coagulum reactor to form a mixture with the latex blend, the carbon black being effective to coagulate the latex, and the feeding of the latex blend and the carbon black slurry within the mixing zone being sufficiently energetic to substantially completely coagulate the latex with the carbon black in the coagulum reactor.

In another aspect, the invention is an elastomer composite. The composite is produced by a process including providing a particulate slurry, providing a latex blend comprising, consisting essentially of, or consisting of skim latex and at least one of field latex and latex concentrate, and combining the particulate slurry and the latex blend under conditions in which the latex content of the latex blend coagulates. The latex blend may include water. The dry rubber content of the latex blend is at least 15% by weight. The latex blend may include field latex at a ratio from about 20:1 to about 1:1 by volume with respect to skim latex. The latex blend may include latex concentrate at a ratio from about 20:1 to about 1:2 by volume with respect to skim latex. The latex blend may include both field latex and latex concentrate in combination with skim latex. Combining may include feeding a continuous flow of carbon black slurry under pressure to a mixing zone of a coagulum reactor to form a mixture with the latex blend, the carbon black being effective to coagulate the latex within the latex blend and the feeding of the latex blend, and the carbon black slurry within the mixing zone being sufficiently energetic to substantially completely coagulate the latex with the carbon black in the coagulum reactor.

In another aspect, the invention is a vulcanized elastomer composite including at least 70 phr carbon black, for example, N234 carbon black, and exhibiting a ratio of T300/T100 of at least 4.5.

It is to be understood that both the foregoing general description and the following detailed description are exemplary and explanatory only and are intended to provide further explanation of the present invention, as claimed.

BRIEF DESCRIPTION OF THE DRAWING

The invention is described with reference to the several figures of the drawing, in which FIG. 1 is a graph detailing the mechanical performance of various rubber compounds with respect to carbon black loading (open triangles, dashed line—wet masterbatch with skim latex; closed squares, solid line—wet masterbatch without skim latex).

DETAILED DESCRIPTION OF THE INVENTION

In one embodiment, an elastomer composite is prepared by providing a particulate slurry and a latex blend comprising, consisting essentially of, or consisting of skim latex and at least one of field latex and latex concentrate. The slurry and the latex blend are combined to form a mixture under conditions in which the mixture coagulates to form a masterbatch crumb.

While it is often desirable to produce elastomer composite with higher loadings of fillers such as carbon black in a continuous wet masterbatch process, coagulated rubbers containing higher loadings of filler are sometimes difficult to pass through downstream processing equipment. We have unexpectedly discovered that, by augmenting an elastomer latex emulsion with skim latex, we can produce a continuous masterbatch crumb, often termed a "coherent worm," in which a filler such as carbon black is highly dispersed but which does not flow under shear. Because it does not flow under shear, the material can be easily dewatered using standard equipment such as the dewatering extruder available from the French Oil Machinery Company (Piqua, Ohio, USA). This enables the continuous production of elastomer composites having high loadings of filler and which can be used to produce vulcanized rubbers having superior properties. In contrast, masterbatch crumb that does flow under shear can backflow in downstream equipment, causing it to clog or to become ineffective at de-watering.

Skim latex is a by-product obtained from the centrifugation of natural rubber latex. Natural rubber latex concentrate is generally produced commercially from field latex by a process of centrifugation. After stabilization of the field latex, it is fed to a continuous centrifuge, which separates it into a stream of latex concentrate and a second stream, known as skim latex. The latex concentrate usually contains about 60% by weight of rubber, and the skim typically contains between 3 and 6% rubber, as well as other substances from the natural rubber latex. It is known that the rubber concentrations in the two streams can be varied by changing the centrifuge configuration, speed and the feed latex flow rate.

Skim latex contains a higher proportion of non-rubber content (NRC) and smaller particles of rubber in an emulsion than in field latex or latex concentrate. The smaller particles have a higher surface area per unit volume than larger particles. Without wishing to be bound by any particular theory, it is thought that either or both of these factors (NRC and surface area) influence the interaction of the particulate filler with the elastomer during coagulation, promoting the formation of a coagulum exhibiting a continuous rubber phase. Furthermore, the methods described herein provide a use for skim latex, a by-product of the production of latex concentrate that is often considered waste. The use of skim latex as described herein also provides for more efficient use of the latex collected from rubber trees.

In certain preferred embodiments, the natural rubber latex (e.g., latex concentrate or field latex) is combined with skim latex before being combined with the particulate slurry. The ratio of latex concentrate with skim latex may vary from about 20:1 to about 1:2 by volume; the ratio of field latex with skim latex may vary from about 20:1 to about 1:1 by volume. In some embodiments, the latex emulsion used to produce the elastomer composite includes both latex concentrate and field latex in any ratio, along with skim latex. The ratio of latex concentrate and/or field latex with skim latex may be varied independently. For example, regardless of whether one or both of field latex and latex concentrate is employed, the ratio of field latex with skim latex may be from about 20:1 to about 15:1, from about 15:1 to about 10:1, from about 10:1 to about 5:1, from about 5:1 to about 2:1, or from about 2:1 to about 1:1, or any range defined by any two of these ratios. Likewise, the ratio of latex concentrate with skim latex may be from about 20:1 to about 15:1, from about 15:1 to about 10:1, from about 10:1 to about 5:1, from about 5:1 to about 2:1, from about 2:1 to about 1:1, or from about 1:1 to about 1:2, or any range defined by any two of these ratios.

Certain embodiments of methods and apparatus for producing elastomer composites are discussed herein. While various embodiments of the invention can employ a variety of different fillers, certain portions of the following detailed description of method and apparatus aspects of the invention will, for convenience, describe their use primarily in producing elastomer composites with carbon black. One skilled in the art will recognize how to employ the method and apparatus disclosed here in accordance with the principles of operation discussed below to produce elastomer composites comprising a number of alternative or additional fillers and other materials.

The elastomer latex may be exploited in any wet masterbatch process, including those discussed below and processes such as those disclosed in, e.g., U.S. Pat. Nos. 5,763,388, 6,841,606, 6,646,028, 7,101,922, and other wet masterbatch processes known to those of skill in the art. In general, an elastomer latex and particulate slurry are combined to form a mixture, which mixture is caused to coagulate to form a masterbatch crumb. The masterbatch crumb is dewatered to form a dewatered coagulum. The dewatered coagulum is further dessicated and then processed to form a vulcanized rubber.

Suitable elastomer latex fluids that may be combined with skim latex include natural rubber latex (including field latex, latex concentrate, or blends of these) and its derivatives such as chlorinated rubber and blends of natural rubber latex. Exemplary natural rubber latices that may be combined with skim latex to form a latex blend for use according to the invention include but are not limited to field latex, latex concentrate (produced, for example, by evaporation, centrifugation or creaming), and mixtures of these in any proportion.

The latex may be modified to adjust the rubber composition, e.g., to modify or at least partially remove non-rubber components or to chemically modify the rubber content in some manner, e.g. by chlorination or by the attachment of a desired chemical moiety. In an alternative embodiment, water may also be added to the latex blend in any concentration, for example, at least 1% by volume, at least 5% by volume, at least 15% by volume, or at least 25% by volume, so long as the blend has a desired dry rubber content such as that described below.

Natural rubber latex, including latices that have been modified, derivatized, or blended as described above, may be further combined with synthetic latices. Exemplary synthetic elastomers include, but are not limited to, rubbers, polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, and propylene and the like and oil-extended derivatives of any of these. Combinations of any of the foregoing may also be used. Particular suitable synthetic rubbers include: copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, allyl-substituted acrylates, vinyl ketone, methyl isopropenyl ketone, methyl vinyl either, alphamethylene carboxylic acids and the esters and amides thereof such as acrylic acid and dialkylacrylic acid amide. Also suitable for use herein are copolymers of ethylene and other high alpha olefins such as propylene, 1-butene and 1-pentene.

The latex should be appropriate for the wet masterbatch process selected and the intended purpose or application of the final rubber product. The latex is typically provided in an aqueous carrier liquid. Selection of a suitable latex or latices will be well within the ability of those skilled in the art given the benefit of the present disclosure and the knowledge of selection criteria generally well recognized in the industry. Preferably, the latex blend, including skim latex, has a dry rubber content (DRC) of at least about 15% by weight, for example, at least about 20%, from about 15% to about 20%, from about 20% to about 25%, from about 25% to about 30%, from about 30% to about 35%, from about 35% to about 50%, from about 50% to about 60%, or a dry rubber content in any range bounded by any two of these endpoints.

The particulate filler fluid may be carbon black slurry or any other suitable filler in a suitable carrier fluid. Selection of the carrier fluid will depend largely upon the choice of particulate filler and upon system parameters. Both aqueous and non-aqueous liquids may be used, with water being preferred in many embodiments in view of its cost, availability and suitability of use in the production of carbon black and certain other filler slurries.

Selection of the particulate filler or mixture of particulate fillers will depend largely upon the intended use of the elastomer masterbatch product. As used here, particulate filler can include any material which is appropriate for use in the masterbatch process used to produce the masterbatch crumb. Suitable particulate fillers include, for example, conductive fillers, reinforcing fillers, fillers comprising short fibers (typically having an L/D aspect ratio less than 40), flakes, etc. In addition to carbon black and silica-type fillers, discussed in more detail below, fillers can be formed of clay, glass, polymer, such as aramid fiber, etc. It is expected that any filler suitable for use in elastomer compositions may be incorporated into elastomer composites according to various embodiments of the invention. Of course, blends of the various particulate fillers discussed herein may also be used.

When a carbon black filler is used, selection of the carbon black will depend largely upon the intended use of the elastomer masterbatch product. Optionally, the carbon black filler can include also any material which can be slurried and combined with a latex in the wet masterbatch process described herein. Exemplary particulate fillers include but are not limited to carbon black, fumed silica, precipitated silica, coated carbon black, chemically functionalized carbon blacks, such as those having attached organic groups, and silicon-treated carbon black, either alone or in combination with each other. Exemplary carbon blacks include ASTM N100 series—N900 series carbon blacks, for example N100 series carbon blacks, N200 series carbon blacks, N300 series carbon blacks, N700 series carbon blacks, N800 series carbon blacks, or N900 series carbon blacks. Carbon blacks sold under the Regal®, Black Pearls®, Spheron®, Sterling®, and Vulcan® trademarks available from Cabot Corporation, the Raven®, Statex®, Furnex®, and Neotex® trademarks and the CD and HV lines available from Columbian Chemicals, and the Corax®, Durax®, Ecorax®, and Purex® trademarks and the CK line available from Evonik (Degussa) Industries, and other fillers suitable for use in rubber or tire applications, may also be exploited for use with various embodiments. Suitable chemically functionalized carbon blacks include those disclosed in International Application No. PCT/US95/16194 (WO 96/18688), the disclosure of which is hereby incorporated by reference. In silicon-treated carbon black, a silicon containing species such as an oxide or carbide of silicon is distributed through at least a portion of the carbon black aggregate as an intrinsic part of the carbon black. Conventional carbon blacks exist in the form of aggregates, with each aggregate consisting of a single phase, which is carbon. This phase may exist in the form of a graphitic crystallite and/or amorphous carbon, and is usually a mixture of the two forms. Carbon black aggregates may be modified by depositing silicon-containing species, such as silica, on at least a portion of the surface of the carbon black aggregates. The result may be described as silicon-coated carbon blacks. The materials described herein as silicon-treated carbon blacks are not carbon black aggregates which have been coated or otherwise modified, but actually represent a different kind of aggregate having two phases. One phase is carbon, which will still be present as graphitic crystallite and/or amorphous carbon, while the second phase is silica (and possibly other silicon-containing species). Thus, the silicon-containing species phase of the silicon-treated carbon black is an intrinsic part of the aggregate; it is distributed throughout at least a portion of the aggregate. It will be appreciated that the multiphase aggregates are quite different from the silica-coated carbon blacks mentioned above, which consist of pre-formed, single phase carbon black aggregates having silicon-containing species deposited on their surface. Such carbon blacks may be surface-treated in order to place a silica functionality on the surface of the carbon black aggregate as described in, e.g., U.S. Pat. No. 6,929,783. In addition, additives may be used, and, in this regard, coupling agents useful for coupling silica or carbon black should be expected to be useful with silicon-treated carbon blacks.

The use of skim latex is appropriate with practically any level of particulate loading. For example, rubbers may be produced with at least 30 phr, at least 40 phr, at least 50 phr, at least 55 phr, at least 60 phr, at least 65 phr at least 70 phr, at least 75 phr, at least 80 phr, at least 85 phr, at least 90 phr, at least 95 phr, or at least 100 phr of filler. However, the use of skim will provide greater advantages with respect to other wet masterbatch methods at higher loadings of filler, for example, at least 50 or at least 60 phr. One of skill in the art will recognize that what constitutes a "high loading" will depend on the morphology of the filler, including, e.g., its surface area and structure.

One or more additives also may be pre-mixed, if suitable, with the particulate slurry or with the elastomer latex fluid or may be combined with the masterbatch crumb during coagulation. Additives also can be mixed into the elastomer masterbatch subsequently, e.g., by dry mixing techniques. Numerous additives are well known to those skilled in the art and include, for example, antioxidants, antiozonants, antidegradants, plasticizers, processing aids (e.g., liquid polymers, oils and the like), resins, flame-retardants, extender oils, lubricants, and a mixture of any of them. Exemplary additives include but are not limited to zinc oxide and stearic acid. The general use and selection of such additives is well known to those skilled in the art.

In certain preferred embodiments, the masterbatch crumb is produced in a continuous flow process involving mixing of elastomer latex and particulate filler fluids at turbulence levels and flow control conditions sufficient to achieve coagulation even without use of traditional coagulating agents. Such methods are described in our commonly owned U.S. Pat. Nos. 6,048,923, 6,413,478, and 6,040,364. In brief, an exemplary method for preparing masterbatch crumb involves feeding simultaneously a slurry of carbon black or other filler and a natural rubber latex fluid or other suitable elastomer fluid to a mixing zone of a coagulum reactor. A coagulum zone extends from the mixing zone, preferably progressively increasing in cross-sectional area in the downstream direction from an entry end to a discharge end. The slurry is fed to the mixing zone preferably as a continuous, high velocity jet of injected fluid, while the natural rubber latex fluid is fed at relatively low velocity. The high velocity, flow rate and particulate concentration of the filler slurry are sufficient to cause mixture and high shear of the latex fluid, flow turbulence of the mixture within at least an upstream portion of the coagulum zone, and substantially completely coagulate the elastomer latex prior to the discharge end. Substantially complete coagulation can thus be achieved without the need for an acid or salt coagulation agent.

After the substantially complete coagulation of the elastomer latex and particulate fluid, masterbatch crumb in the form of "worms" or globules is formed and discharged from the discharge end of the coagulum reactor as a substantially constant flow concurrently with the on-going feeding of the latex and carbon black slurry streams into the mixing zone of the coagulum reactor. Preferably, the masterbatch crumb is in the form of a "coherent worm," a continuous latex-filler composite in which the carbon black is dispersed within the coagulated latex, rather than a discontinuous flow of composite in which discrete globules of coagulated latex are separated by an aqueous carrier. Notably, the plug-type flow and atmospheric or near atmospheric pressure conditions at the discharge end of the coagulum reactor are highly advantageous in facilitating control and collection of the elastomer composite product, such as for immediate or subsequent further processing steps. The masterbatch crumb is created and then formed into a desirable extrudate, for example, having from about 70% to about 85% water content by weight. After formulation, the masterbatch crumb is passed to suitable drying and compounding apparatus.

In certain embodiments, the masterbatch crumb is passed from coagulum reactor to a de-watering extruder. The dewatering extruder may bring natural rubber masterbatch crumb from, e.g., approximately 70-85% water content to approximately 10% to 20% water content. In certain preferred embodiments, the de-watering extruder reduces the water content of a natural rubber extrudate to about 15%. The optimal water content may vary with the elastomer employed and the type of filler. If the water content is too high, then masticating the material as further discussed below will simply remove water without substantially improving rubber-filler interactions or rubber properties. If the water content is too low, then mastication will increase the temperature of the material and degrade the rubber without promoting polymer-filler interactions. Suitable de-watering extruders are well known and commercially available from, for example, the French Oil Machinery Co. (Piqua, Ohio, USA).

After de-watering, the resulting dewatered coagulum may be dried. In certain embodiments, the dewatered coagulum is simply thermally dried. Preferably, the dewatered coagulum is mechanically masticated while drying. For example, the dewatered coagulum may be mechanically worked with one or more of a continuous mixer, an internal mixer, a twin screw extruder, a single screw extruder, or a roll mill. Suitable masticating devices are well known and commercially available, including for example, a Unimix Continuous Mixer and MVX (Mixing, Venting, eXtruding) Machine from Farrel Corporation of Ansonia, Conn., a long continuous mixer from Pomini, Inc., a Pomini Continuous Mixer, twin rotor corotating intermeshing extruders, twin rotor counterrotating non-intermeshing extruders, Banbury mixers, Brabender mixers, intermeshing-type internal mixers, kneading-type internal mixers, continuous compounding extruders, the biaxial milling extruder produced by Kobe Steel, Ltd., and a Kobe Continuous Mixer. Alternative masticating apparatus suitable for use with various embodiments of the invention will be familiar to those of skill in the art. Exemplary methods for mechanically masticating dewatered composite are disclosed in U.S. Pat. Nos. 6,929,783 and 6,841,606, and U.S. Provisional Patent Application No. 61/065,086, filed Feb. 8, 2008.

In certain preferred embodiments, additives can be combined with the dewatered coagulum in the mechanical mixer. Specifically, additives such as filler (which may be the same as, or different from, the filler used in the coagulum reactor; exemplary fillers including silica and zinc oxide, with zinc oxide also acting as a curing agent), antioxidants, antiozonants, plasticizers, processing aids (e.g., stearic acid, which can also be used as a curing agent, liquid polymers, oils and the like), other elastomers, other or additional masterbatch, resins, flame-retardants, extender oils, lubricants, and a mixture of any of them, can be added in the mechanical mixer. Alternatively or in addition, additional elastomers can be combined with the dewatered coagulum to produce elastomer blends. Exemplary elastomers include, but are not limited to, rubbers, polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, and propylene and the like. Methods of producing masterbatch blends are disclosed in our commonly owned U.S. Pat. Nos. 7,105,595, 6,365,663, and 6,075,084.

The methods and apparatus of the present invention can be used to form products which include, but are not limited to shoe soles, tires, tire treads, tire sidewalls, wire-skim for tires, cushion gum for retread tires, rubber components of engine mounts, tank tracks, mining belts, rubber components of hydro-mounts, bridge bearings, and seismic isolators.

The present invention will be further clarified by the following examples which are intended to be only exemplary in nature.

EXAMPLES

Example 1

Elastomer composite was produced with an elastomer latex including a blend of field latex and/or latex concentrate with skim latex. The latex compositions are outlined in Table 1, below.

TABLE 1

Latex Blends

|  | A | B | C | D* | E* | F | G | H* | I* | J |
|---|---|---|---|---|---|---|---|---|---|---|
| Parts of field latex by volume | 100 | 100 | 100 | 100 | 100 | 0 | 0 | 0 | 0 | 100 |
| Parts of skim latex by volume | 50 | 50 | 10 | 0 | 0 | 100 | 50 | 0 | 0 | 100 |
| Parts of concentrate by volume | 0 | 0 | 0 | 0 | 0 | 100 | 100 | 100 | 100 | 40 |
| Parts of water | 0 | 0 | 0 | 0 | 60 | 0 | 50 | 0 | 100 | 0 |
| Final DRC (%) | 21.5 | 20.3 | 27.6 | 28.7 | 18.9 | 32.1 | 30.9 | 59.8 | 30.0 | 23.6 |
| Final TSC (%) | 24 | 22.8 | 29.9 | 30.8 | 20.7 | 34.1 | 32.8 | 61.7 | 30.8 | 26.0 |
| Non-rubbers (TSC − DRC) (%) | 2.5 | 2.4 | 2.3 | 2.1 | 1.8 | 2 | 1.9 | 1.9 | 0.8 | 2.4 |

DRC = Dry rubber content;
TSC = Total solids content;
*= Comparative examples

The following procedure was used to prepare elastomer composites A-O.

Carbon Black Slurry Preparation

Dry carbon black (N234, obtained from Cabot Corporation) was mixed with water and ground to form a slurry having a concentration of about 13-17%. The slurry was fed to a homogenizer at an operating pressure of around 3000 psig such that the slurry was introduced as a jet into the mixing zone to produce a finely ground carbon black slurry.

Latex Delivery

Field latex and/or latex concentrate were mixed with skim latex for about 5 minutes using a paddle mixer at one of the ratios indicated above and allowed to sit overnight. Mixtures of latex concentrate with skim latex were also provided by the latex supplier. The latex mixtures were stable for several days. The latex mixture was pumped to the mixing zone of the coagulum reactor. The latex flow rate was adjusted between 700-1200 kg/h in order to obtain the desired final carbon black loading levels.

Carbon Black and Latex Mixing

The carbon black slurry and latex were mixed by entraining the latex into the carbon black slurry. During the entrainment process, the carbon black was intimately mixed into the latex and the mixture coagulated. For successful samples, coherent, continuous spongy "worms" of masterbatch crumb exited the coagulum reactor. Table 2, below, shows the maximum loading, i.e., the maximum filler content in the elastomer composite, in parts per hundred of rubber (phr), for which coherent worm was produced (that is, attempts to produce elastomer composite with higher filler content did not result in a coherent worm). Table 2 shows that blends of skim latex with either or both of field latex or latex concentrate increased the carbon black loading at which a coherent worm could be produced in comparison to latices that were not blended with skim or latices that were only mixed with water. Table 3, below, shows, for various latex blends at a given loading, whether coherent worm was produced. Table 3 shows that, while the use of skim improved the consistency of the masterbatch crumb, simple addition of water to field latex (e.g., Latex Blend E*) or latex concentrate (e.g., Latex Blend I*) did not produce superior results to the use of field latex (Latex Blend D*) or latex concentrate (Latex Blend H*) alone.

TABLE 2

| Latex blend | Maximum loading (phr) |
|---|---|
| A | 73 |
| B | 70 |
| C | 65 |
| D* | 61 |
| E* | 60 |
| F | 54 |
| G | 50 |
| H* | 39 |
| I* | 39 |
| J | 66 |

TABLE 3

| Latex Blend | CB Loading (phr) | Coherence of worm |
|---|---|---|
| F | 45 | Good |
| G | 45 | Good |
| H* | 45 | Bad |
| I* | 45 | Bad |
| B | 65 | Good |
| C | 65 | Good |
| D* | 65 | Bad |
| E* | 65 | Bad |

Dewatering

The masterbatch crumb discharged from the coagulum reactor was dewatered to 10-20% moisture with a dewatering extruder (The French Oil Machinery Company). In the extruder, the masterbatch crumb was compressed, and water squeezed from the crumb was ejected through a slotted barrel of the extruder.

Drying and Cooling

The dewatered coagulum was dropped into a continuous compounder (FCM) where it was masticated and mixed with antioxidant. The moisture content of the masticated masterbatch exiting the FCM was around 1-2%. The product was further masticated and cooled on an open mill.

Curing

The cooled elastomer composite was compounded according to the formulation in Table 4 and the procedure outlined in Table 5, below.

TABLE 4

| Ingredient | Phr |
|---|---|
| Rubber | 100 |
| N234 | 40-75 |
| ZnO | 4 |
| Stearic acid | 2 |
| 6PPD* (antioxidant) | 1.5 |
| TBBS** (accelerator) | 0.8 |
| Sulfur | 1.2 |

*N-(1,3-dimethylbutyl)-N'-phenyl-p-phenylenediamine
**N-tert-butyl-2-benzothiozolesulphenamide

TABLE 5

| | Time (min) | Operation |
|---|---|---|
| Stage 1 | | Farrel BR Banbury mixer (1600 cc), 75% fill factor, 80 rpm, 50° C. |
| | 0 | Add rubber-carbon black masterbatch |
| | 1 | Add zinc oxide, stearic acid and 6PPD |
| | 3 | Dump |
| | | Roll mill using 4 cross-cuts and 2 end rolls |
| Stage 2 | | Farrel BR Banbury mixer (1600 cc), 65% fill factor, 60 rpm, 50° C. |
| | 0 | Add stage 1 compound, sulfur and accelerator |
| | 1 | Dump |
| | | Roll mill using 4 cross-cuts and 2 end rolls |
| | | Sit at room temperature for at least 2 hours |

The compounded material was vulcanized; the properties of the resulting elastomer composites are shown in Table 6 below. The tensile stress of vulcanized samples (T300 and T100) were measured according to ASTM standard D-412. Dynamic mechanical properties were determined using a dynamic strain sweep at 10 Hz and 60° C. Rebound was determined using a Zwick Rebound Pendulum Model 5105.

TABLE 6

| Elastomer Composite | Latex Blend | CB loading (phr) | T100 (MPa) | T300 (MPa) | T300/T100 | Rebound (%) | Tan δ (max) at 60° C. |
|---|---|---|---|---|---|---|---|
| A | A | 52 | 2.8 | 17.6 | 6.3 | 52.2 | 0.194 |
| B | A | 70 | 5.0 | 24.0 | 4.8 | 39.3 | 0.237 |
| C | B | 52 | 2.9 | 17.0 | 5.8 | 52.0 | 0.207 |
| D | B | 60 | 4.0 | 21.5 | 5.3 | 47.1 | 0.205 |
| E | B | 67 | 4.7 | 23.1 | 4.9 | 41.4 | 0.235 |
| F | C | 56 | 3.1 | 18.9 | 6.1 | 48.9 | 0.187 |
| G | C | 59 | 3.7 | 20.9 | 5.6 | 45.5 | 0.200 |
| H | C | 67 | 4.4 | 22.8 | 5.2 | 42.3 | 0.223 |
| I | F | 42 | 2.3 | 14.1 | 6.1 | 57.2 | 0.166 |
| J | F | 51 | 2.8 | 17.1 | 6.1 | 53.2 | 0.177 |
| K | G | 42 | 2.3 | 14.6 | 6.3 | 57.6 | 0.165 |
| L | G | 53 | 2.6 | 16.7 | 6.4 | 49.9 | 0.179 |
| M | J | 51 | 2.9 | 17.0 | 5.9 | 52.9 | 0.184 |
| N | J | 60 | 3.6 | 20.8 | 5.7 | 46.5 | 0.212 |
| O | J | 64 | 4.1 | 22.4 | 5.5 | 45.3 | 0.221 |

Comparative Example 1

Elastomer composites were prepared using Latex Blend D* as described above, at a variety of loadings of N234 carbon black. The elastomer composites were compounded as described above. FIG. 1 is a graph co-plotting tan delta at 60° C. for both the compounds prepared with composites incorporating Latex Blend D* and for the compounds listed in Table 6. The graph shows that the performance of compounds prepared using elastomer composites incorporating various amounts of skim latex is comparable to the performance of compounds prepared without skim. Skim latex may be used to ease the manufacturing of more highly loaded elastomer composites without sacrificing performance of the final rubber compounds.

Comparative Examples 2-6

Dry-mixed elastomer composites were prepared using the formulations in Table 2, according to the procedure outlined in Table 7.

TABLE 7

| | Time (min) | Operation |
|---|---|---|
| Stage 1 | | Farrel BR Banbury mixer (1600 cc), 75% fill factor, 80 rpm, 50° C. |
| | 0 | Add polymer |
| | 0.5 | Add filler |
| | 2.5 | Add zinc oxide, stearic acid, and 6PPD |
| | 4 | Dump |
| | | Roll mill using 4 cross-cuts and 2 end rolls |
| Stage 2 | | Farrel BR Banbury mixer (1600 cc), 65% fill factor, 60 rpm, 50° C. |
| | 0 | Add stage 1 compound |
| | 1 | Dump |
| | | Roll mill using 4 cross-cuts and 2 end rolls |
| | | Sit at room temperature for at least 2 hours |

The material was vulcanized, and the resulting elastomeric composite properties are shown in Table 8.

TABLE 8

| Comparative Example # | CB loading (phr) | T100 (MPa) | T300 (MPa) | T300/T100 | Rebound (%) | Tan δ (max) at 60° C. |
|---|---|---|---|---|---|---|
| 2 | 42 | 2.5 | 12.9 | 5.2 | 50.7 | 0.191 |
| 3 | 52 | 2.5 | 13.9 | 4.6 | 49.5 | 0.193 |
| 4 | 62 | 3.9 | 19.1 | 4.9 | 41.6 | 0.225 |
| 5 | 66 | 4.5 | 20.5 | 4.6 | 39.7 | 0.222 |
| 6 | 70 | 5.0 | 21.8 | 4.4 | 37.7 | 0.232 |

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of producing an elastomer composite, comprising:
   providing a particulate slurry; and
   providing a latex blend comprising skim latex and at least one of field latex and latex concentrate, wherein the dry rubber content of the latex blend is at least 15% by weight; and combining the particulate slurry and the latex blend to form a mixture under conditions in which the mixture coagulates, wherein, when field latex is employed, the latex blend comprises field latex at a ratio from about 20:1 to about 1:1 by volume with respect to skim latex, and when latex concentrate is employed, the latex blend comprises latex concentrate at a ratio from about 20:1 to about 1:2 by volume with respect to skim latex.

2. The method of claim 1, wherein the latex blend comprises both field latex and latex concentrate in combination with skim latex.

3. The method of claim 1, wherein the latex blend further comprises water.

4. The method of claim 1, wherein combining comprises feeding a continuous flow of carbon black slurry under pressure to a mixing zone of a coagulum reactor to form a mixture with the latex blend, the carbon black being effective to coagulate the latex within the latex blend and the feeding of the latex blend and the carbon black slurry within the mixing zone being sufficiently energetic to substantially completely coagulate the latex with the carbon black in the coagulum reactor.

5. An elastomer composite comprising the coagulated product of a mixture of a particulate slurry and a latex blend comprising skim latex and at least one of field latex and latex concentrate and having a dry rubber content of at least 15% by weight, wherein, when field latex is employed, the latex blend comprises field latex at a ratio from about 20:1 to about 1:1 by volume with respect to skim latex, and when latex concentrate is employed, the latex blend comprises latex concentrate at a ratio from about 20:1 to about 1:2 by volume with respect to skim latex.

6. The elastomer composite of claim 5, wherein the latex blend further comprises water.

7. The elastomer composite of claim 5, wherein the latex blend comprises both field latex and latex concentrate in combination with skim latex.

8. An elastomer composite produced by a process comprising:

providing a particulate slurry;

providing a latex blend comprising skim latex and at least one of field latex and latex concentrate wherein the dry rubber content of the latex blend is at least 15% by weight; and combining the particulate slurry and the latex blend under conditions in which the latex content of the latex blend coagulates, wherein, when field latex is employed, the latex blend comprises field latex at a ratio from about 20:1 to about 1:1 by volume with respect to skim latex, and when latex concentrate is employed, the latex blend comprises latex concentrate at a ratio from about 20:1 to about 1:2 by volume with respect to skim latex.

9. The elastomer composite of claim 8, wherein the latex blend further comprises water.

10. The elastomer composite of claim 8, wherein the latex blend comprises both field latex and latex concentrate in combination with skim latex.

11. The elastomer composite of claim 8, wherein combining comprises feeding a continuous flow of carbon black slurry under pressure to a mixing zone of a coagulum reactor to form a mixture with the latex blend, the carbon black being effective to coagulate the latex within the latex blend and the feeding of the latex blend and the carbon black slurry within the mixing zone being sufficiently energetic to substantially completely coagulate the latex with the carbon black in the coagulum reactor.

* * * * *